United States Patent [19]

Hörlein et al.

[11] 3,883,552
[45] May 13, 1975

[54] (D1)-THIOPHOSPHORIC ACID ESTERS

[75] Inventors: Gerhard Hörlein, Frankfurt, Main; Gerhard Salbeck, Kelkheim, Taunus, both of Germany

[73] Assignee: Hoechst Aktiengesellschaft, Frankfurt, Main, Germany

[22] Filed: July 10, 1973

[21] Appl. No.: 377,954

Related U.S. Application Data

[63] Continuation-in-part of Ser. No. 293,133, Sept. 28, 1973, abandoned, and a continuation-in-part of Ser. No. 293,134, Sept. 28, 1973, abandoned.

[52] U.S. Cl. ................... 260/327 TH; 424/275
[51] Int. Cl. ................................. C07d 65/08
[58] Field of Search ............ 260/327 TH, 330.5

[56] References Cited
UNITED STATES PATENTS

| | | | |
|---|---|---|---|
| 3,288,808 | 11/1966 | Kilsheimer et al. | 260/330.5 |
| 3,428,655 | 2/1969 | Melton et al. | 260/330.5 |
| 3,590,052 | 6/1971 | Barker | 260/327 |

*Primary Examiner*—Henry R. Jiles
*Assistant Examiner*—C. M. S. Jaisle
*Attorney, Agent, or Firm*—Curtis, Morris & Safford

[57] ABSTRACT

Compounds of the formula

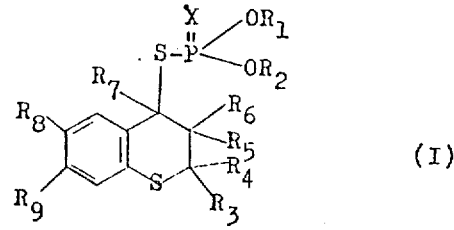

(I)

wherein
$R_1$ and $R_2$ are alkyl having from one to six carbon atoms;
$R_3$, $R_4$, $R_5$, $R_6$, $R_7$ are hydrogen or alkyl having from one to four carbon atoms; at least three of the radicals $R_3$ to $R_7$ being hydrogen;
$R_8$, $R_9$ are hydrogen, halogen, alkyl or alkoxy each having from one to four carbon atoms;
X is oxygen or sulfur.

The compounds have a good activity against insects, acarides, nematodes and animal ectoparasites.

9 Claims, No Drawings

(D1)-THIOPHOSPHORIC ACID ESTERS

This application is a continuation-in-part of our copending applications Ser. Nos. 293,133 and 293,134, both filed Sept. 28, 1972 and both now abandoned.

The present invention relates to compounds of the formula

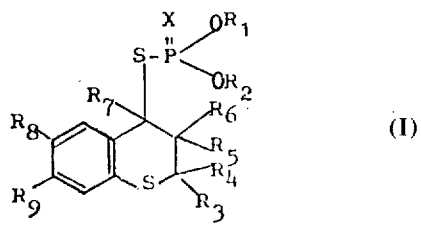

wherein
$R_1$ and $R_2$ are alkyl having from one to six carbon atoms;
$R_3$, $R_4$, $R_5$, $R_6$, $R_7$ are hydrogen or alkyl having from one to four carbon atoms; at least three of the radicals $R_3$ to $R_7$ being hydrogen;
$R_8$, $R_9$ are hydrogen, halogen, alkyl or alkoxy each having from one to four carbon atoms;
X is oxygen or sulfur.

The compounds of formula I are prepared by reacting 4-halogeno-thiochromanyl compounds of the formula

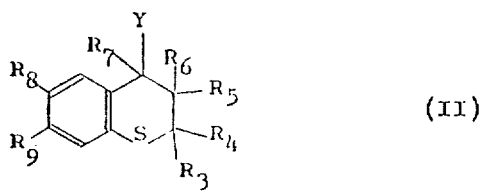

wherein Y is halogen, with phosphorus compounds of the formula

or the salts thereof, if necessary in the presence of an acid binding agent.

The compounds of formula I have good insecticidal, acaricidal and nematocidal properties.

The present invention thus relates also to insecticidal, acaricidal and/or nematocidal products which contain a compound of formula I as active substance.

The reaction is generally carried out using about stoichiometric amounts of the reactants; a slight excess of the compound of formula III being advantageous. It is recommended to operate in the presence of a solvent inert under the reaction conditions. Such solvents are for example benzene or alkylbenzene, such as toluene or xylene; halogeno-benzenes, such as chlorobenzene or dichlorobenzene; halogenated aliphatics, such as methylene chloride, chloroform, carbon tetrachloride, dichloro-ethane; ethers, such as diethyl ether, diisopropyl ether, glycol-dimethyl ether, tetrahydrofuran, dioxan, or ketones and nitriles, such as acetone, methylethylketone, methyl-isopropylketone, methylbutylketone, benzonitrile or propionitrile. Polar solvents are preferred.

The reaction temperatures are not critical and may be varied within wide limits, for example in a range of from −20° to +140° C. Generally, room temperature or temperatures establishing themselves by the exothermic reaction are preferred.

The reaction proceeds with exchange of the halogen atom Y. Therefore, it is carried out either with addition of acid binding agents, or using salts, especially alkali metal or ammonium salts of the phosphorus compounds of formula III. Preferred acid binding agents are alkali metal hydroxides and alkali metal carbonates; but tertiary nitrogen bases, for example pyridine or triethylamine, may also be employed.

According to the process of the invention, the compounds of formula I are obtained with a very high yield and purity degree.

The starting compounds of formula III are known and can be easily prepared according to usual methods.

The 4-halogeno-thiochromanyl compounds of formula II and their preparation are partly described in French Pat. No. 1,584,755, partly they are novel compounds; also their pre-stages are in part new. They are prepared according to known processes by first reducing benzene sulfochlorides to the corresponding thiophenols. In a second reaction step, the thiophenols are reacted with substituted halogeno-propionic acids or 1,2- unsaturated acids, and the phenylmercapto-propionic acids obtained are cyclized in the presence of dehydrating agents, for example concentrated sulfuric acid, polyphosphoric acid or phosphorus pentoxide, to form thiochromanones.

By reduction of the thiochromanones according to known processes, for example by means of sodium boron hydride or by a reduction according to Grignard, 4-hydroxy-thiochromane compounds are obtained which, also in known manner, are converted to the 4-halogeno-thiochromanyl compounds of formula II with the aid of a halogenating agent, for example phosphorus trichloride, phosphorus tribromide, thionyl chloride, sulfuryl chloride or halogen hydracids. The reaction proceeds for example according to the following scheme:

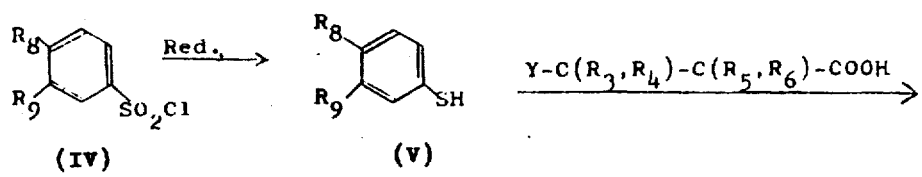

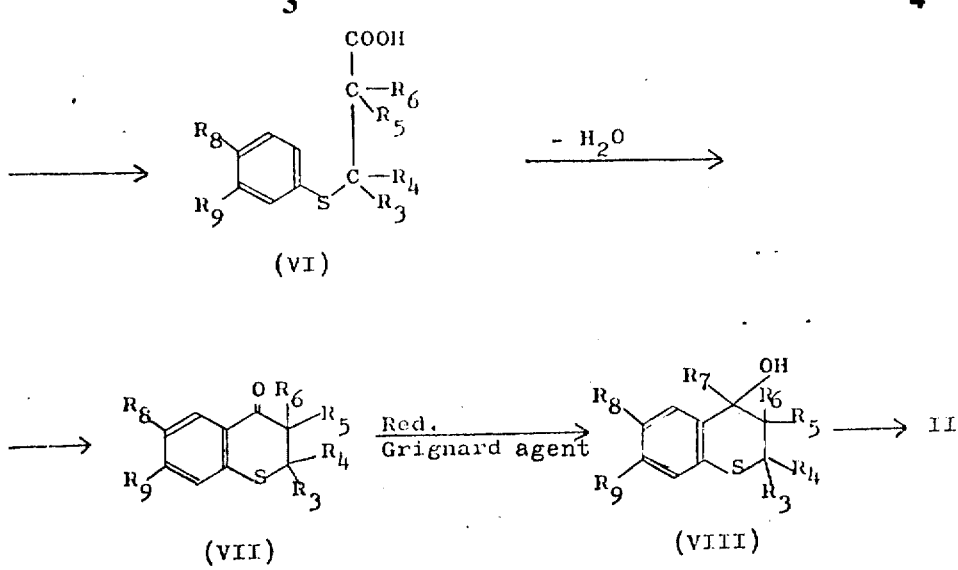

As substituents $R_1$ and $R_2$, any straight-chain or branched alkyl radicals having from one to six carbon atoms may be used, preferably methyl, ethyl, n-propyl or isopropyl.

Preferred radicals $R_3$ to $R_7$ are hydrogen, methyl or ethyl. Examples or $R_8$ and $R_9$ are: fluorine, chlorine, bromine, methyl, ethyl, isopropyl, tertiary butyl; methoxy, ethoxy, propoxy, tertiary butoxy.

The alkyl and alkoxy groups contain preferably one to two carbon atoms. Advantageous are combinations wherein both radicals $R_8$ and $R_9$ are hydrogen, or one of these radicals at least is chlorine or bromine.

The compounds of formula I are suitable for the destruction of numerous pests of the different crop plants including their development stages, and they have an insecticidal as well as an acaricidal activity. Thus, different spider mite species, for example the European red mite (Metatetranychus ulmi), or mites like *Panonychus citri* or *Tetranychus urticae*, among them also strains resistant to phosphoric esters can be controlled with good results.

Also numerous biting and sucking insects noxious to crop plants can be destroyed by the compounds of the invention, for example beetles, such as the Mexican bean beatle (*Epilachna varivestis*), the Colorado beetle (*Leptinotarsa decemlineata*), the flower beetle (*Epicometis hirta*), the flea beetle (*Phyllotreta spp.*), the strawberry borer (*Coenorrhinus germanicus*), or the boll weevel (*Anthonomus grandis*); butterflies and their larvae, such as the Egyptian and the Old World boll worm (*Earias insulana* and *Heliothis armigera*); leaf rollers, especially the codling moth (*Carcocapsa pomonella*), the green oak leaf roller (*Tortrix viridana*), the tortrix moth (*Capua reticulana*), the corn borer (*Ostrinia nubilalis*) or the winter moth (*Cheimatobia brumata*); aphids, such as the bean aphid (*Doralis fabae*), the green peach aphid (*Myzodes persicae*), the cotton aphid (*Aphis gossypii*); or bugs, such as milkweed bugs and cotton stainers (*Oncopeltus fasciatus* and *Dysdercus spp.*, especially fasciatus).

The compounds are furthermore useful for the combating of animal ectoparasites. The term "ectoparasites" as herein used refers to members of the phylum Arthropoda and, more exactly, of the class Insecta (insects) and the order Acarina (ticks and mites) that live on the surface of warm-blooded animals and, as bloodsuckers, irritants and carriers of infectious diseases, may cause extensive damage in stock-farming.

Among the animal ectoparasites of the insect class against which the compounds of formula I are active are lice (Haematopinidae), fleas (Ceratophyllidae), maallopaga, furthermore flies, especially gad flies (Stomoxydinae) and horse flies (Tabanidae), those flies the development stages (larvae) of which parasite in the animal body (Calliphoridae, Sarcophagidae, Gastrophilidae, Oestridae), and louse flies (Hippobascidae). Among the ectoparasites of the mite class (Acari) are sarcoptides (Sarcoptidae), dermanyssides (Dermanyssidae), argasides (Argasidae) and ixodides (Ixodidae), especially the monoxenous cattle ticks Boophilus microplus and Boophilus decoloratus, and the heteroxenous species of the genus Rhipicephalus, Ablyomma and Hyalomma.

The compounds of the invention are also suitable for combating certain nematode species noxious to plants.

They are of low toxicity to warmblooded animals and partly have a very low toxicity to fish, so that they may be applied for example for combating infection-carrying mosquitoes (yellow fever mosquitoes, anopheles) in their larval stage.

On account of their different chemical structure, the compounds of the invention may also be used for combating such strains of organisms which are resistant to other biocides.

The phosphoric acid esters of the present invention may be formulated in admixture with solid or liquid inert carrier substances, adhesives, wetting and dispersing agents, or grinding auxiliaries in the form of wettable powders, emulsions, suspensions, dusting powders, granules, fly-bands, products for spreading and washing. They may be mixed with other insecticides, fungicides, nematocides and herbicides. When used as ectoparasiticides, they are applied normally by spraying, dusting or dipping methods, as well as, in the special case of the anti-tick agents, in the so-called dip or spray equipment.

As carrier material, mineral substances may be used, for example aluminum silicates, argillaceous earths, kaolin, chalks, siliceous chalks, talcum, kieselguhr or hydrated silicic acids, or preparations of these mineral substances with special additives, for example chalk with sodium stearate. As carrier material for liquid preparations, all usual and suitable organic solvents may be employed, for example toluene, xylene, diacetone alcohol, isophorone, gasolines, paraffin oils, dioxan, dimethyl formamide, dimethyl sulfoxide, ethyl acetate, butyl acetate, tetrahydrofuran, chlorobenzene and the like.

Suitable adhesives are glue-like cellulose products or polyvinyl alcohols.

As wetting agents, all suitable emulsifiers may be used, for example ethoxylated alkylphenols, salts of aryl- or alkyl-aryl-sulfonic acids, salts of oxethylated benzenesulfonic acids, or soaps.

Suitable dispersing agents are cellulose pitch (salts of sulfite cellulose waste liquor), salts of naphthalenesulfonic acid or, in certain cases, hydrated silicic acids or kieselguhr.

As grinding auxiliaries, suitable inorganic or organic salts, for example sodium sulfate, ammonium sulfate, sodium carbonate and sodium bicarbonate, sodium thiosulfate, sodium stearate, or sodium acetate may be used.

The content of active substance in the ready-for-use products is generally from 2 to 95%.

Simple formulations suitable for the activity tests may be obtained in the following manner:

Wettable powder:

6 g of active substance are ground with 6 g of finely dispersed silicic acid, and subsequently mixed in a mixer with 48 g of a mixture containing 13.3% of dried cellulose waste liquor, 65.3% of quartz and aluminium silicate; 15.3% of finely dispersed silicic acid, 4.7% of polypropylene-glycol and 1.3% of the sodium salt of oleylmethyltauride. Thus, 60 g of a 10% wettable powder are obtained.

Emulsifiable concentrate:

2 g of active substance, 16 g of cyclohexanone and 2 g of alkylaryl-polyglycol ether alcohol are mixed with each other. 20 g of a 10% emulsifiable concentrate are obtained.

The following Examples illustrate the invention.

General prescription:

0.1 Mole of a halogeno-thiochromane of formula II is added, at room temperature and with agitation, to a solution or suspension of 0.10 to 0.11 mole of a dithiophosphate of formula III in 220 ml of glycol-dimethyl ether. Stirring is continued for about 15 hours at room temperature, the precipitated salt is separated by suction-filtration, the filtrate is diluted with about 400 ml of benzene, the organic phase is thoroughly washed with water and dried over $Na_2SO_4$. After having distilled off the solvent, the products of the process are obtained as oils which, in part, crystallize on trituration.

According to this process as indicated above, the following compounds are obtained:

| Example | Formula | $n_D$ or melting point (°C) | Yield % of theoretical yield | Analysis Calc. | | Found |
|---|---|---|---|---|---|---|
| 1 | S-P(OCH$_3$)$_2$ (thiochromane, S=P) | $n_D^{29.5}$ 1,6226 | 91,5 | 43.14<br>4.9<br>10.13<br>31.37 | C<br>H<br>P<br>S | 43.3<br>4.9<br>10.0<br>31.4 |
| 2 | S-P(OC$_2$H$_5$)$_2$ (thiochromane, S=P) | melting point 49–50 | 90 | 46.7<br>5.7<br>9.3<br>28.7 | C<br>H<br>P<br>S | 46.9<br>5.6<br>9.2<br>29.7 |
| 3 | S-P(OC$_3$H$_7$)$_2$ iso (thiochromane, S=P) | $n_D^{31}$ 1,5809 | 96 | 49.72<br>6.35<br>8.56<br>26.52 | C<br>H<br>P<br>S | 50.4<br>6.4<br>8.6<br>27.1 |
| 4 | S-P(OCH$_3$)$_2$ (thiochromane, O=P) | $n_D^{24}$ 1,5818 | 86 | 45.5<br>5.2<br>10.7<br>22.0 | C<br>H<br>P<br>S | 45.8<br>5.3<br>10.2<br>21.7 |
| 5 | S-P(OC$_2$H$_5$)$_2$ (thiochromane, O=P) | $n_D^{24}$ 1,5701 | 81 | 49.1<br>6.0<br>9.7 | C<br>H<br>P | 48.9<br>6.3<br>9.3 |
| 6 | F-thiochromane S-P(OCH$_3$)$_2$ (S=P) | $n_D^{29.5}$ 1,6056 | 90 | 9.6<br>29.6 | P<br>S | 9.8<br>30.0 |

―Continued

| Example | Formula | $n_D$ or melting point (°C) | Yield % of theoretical yield | Analysis Calc. | | Found |
|---|---|---|---|---|---|---|
| 7 | F-[thiochroman]-S-P(=S)(OC₂H₅)(OC₂H₅) | $n_D^{31.5}$ 1,5879 | 91 | 8.8<br>27.2 | P<br>S | 8.6<br>27.6 |
| 8 | F-[thiochroman]-S-P(=O)(OCH₃)₂ | $n_D^{23.5}$ 1,566 | 86 | 10.1<br>20.8 | P<br>S | 10.6<br>20.9 |
| 9 | F-[thiochroman]-S-P(=O)(OC₂H₅)₂ | $n_D^{21.5}$ 1,5558 | 89 | 9.2<br>19.0 | P<br>S | 9.5<br>19.1 |
| 10 | Cl-[thiochroman]-S-P(=S)(OCH₃)(OCH₃) | melting point 52-54 | 92 | 38.77<br>4.11<br>9.1<br>28.19 | C<br>H<br>P<br>S | 38.6<br>4.1<br>8.8<br>28.4 |
| 11 | Cl-[thiochroman]-S-P(=S)(OC₂H₅)(OC₂H₅) | $n_D^{31.5}$ 1,611 | 97 | 42.34<br>4.83<br>8.41<br>26.06 | C<br>H<br>P<br>S | 42.4<br>4.9<br>8.2<br>26.3 |
| 12 | Cl-[thiochroman]-S-P(=O)(OC₂H₅)(OC₂H₅) | $n_D^{29.5}$ 1,5794 | 96,5 | 8.8<br>18.2 | P<br>S | 8.5<br>18.4 |
| 13 | Cl-[thiochroman]-S-P(=S)(OC₃H₇ iso)(OC₃H₇ iso) | $n_D^{24}$ 1,5979 | 90 | 45.40<br>5.55<br>7.83<br>24.21 | C<br>H<br>P<br>S | 46.0<br>5.4<br>7.5<br>23.7 |
| 14 | Cl-[thiochroman]-S-P(=S)(OC₄H₉ sec.)(OC₄H₉ sec.) | $n_D^{24}$ 1,5929 | 89 | 48.06<br>6.13<br>7.30<br>22.85 | C<br>H<br>P<br>S | 48.8<br>5.8<br>7.0<br>22.4 |
| 15 | Cl-[thiochroman]-S-P(=S)(OC₆H₁₃)(OC₆H₁₃) | $n_D^{24}$ 1,574 | 98 | 52.65<br>7.03<br>6.45<br>19.93 | C<br>H<br>P<br>S | 52.9<br>7.0<br>6.1<br>20.3 |
| 16 | Cl-[thiochroman]-S-P(=O)(OCH₃)₂ | $n_D^{24}$ 1,5789 | 76 | 9.5<br>19.7 | P<br>S | 9.4<br>19.7 |
| 17 | Cl-[2-methyl-thiochroman]-S-P(=S)(OCH₃)(OCH₃) | melting point 67-70 | 94.5 | 8.75<br>27.10 | P<br>S | 8.5<br>26.8 |
| 18 | Cl-[2-methyl-thiochroman]-S-P(=S)(OC₂H₅)(OC₂H₅) | $n_D^{28}$ 1.5958 | 96.5 | 8.1<br>25.1 | P<br>S | 8.0<br>26.0 |

—Continued

| Example | Formula | $n_D$ or melting point (°C) | Yield % of theoretical yield | Analysis Calc. | | Found |
|---|---|---|---|---|---|---|
| 19 | 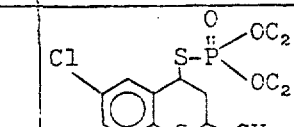 | $n_D^{33}$ 1.5633 | 88.5 | 8.5<br>17.4 | P<br>S | 8.5<br>17.0 |
| 20 | 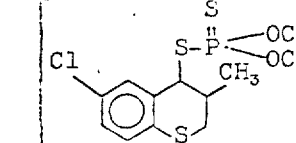 | $n_D^{34}$ 1.602 | 78 | 44.0<br>5.24<br>25.1 | C<br>H<br>S | 44.2<br>5.2<br>24.7 |
| 21 | 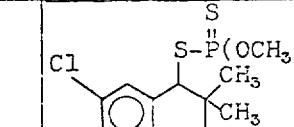 | $n_D^{24}$ 1.583 | 60 | 8.4<br>26.6 | P<br>S | 8.0<br>26.0 |
| 22 | 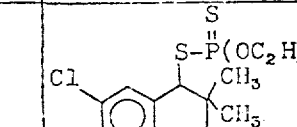 | $n_D^{24}$ 1.591 | 81 | 45.4<br>5.5<br>7.8<br>24.2 | C<br>H<br>P<br>S | 45.4<br>5.5<br>7.4<br>23.3 |
| 23 | 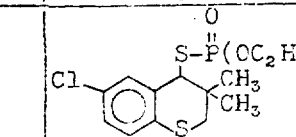 | $n_D^{24}$ 1,5691 | 86 | 8.1<br>16.8 | P<br>S | 7.8<br>16.4 |
| 24 | 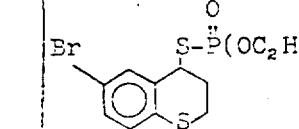 | $n_D^{22}$ 1.5901 | 87 | 39.3<br>4.5<br>7.8<br>16.1 | C<br>H<br>P<br>S | 39.3<br>4.8<br>7.9<br>16.1 |
| 25 | 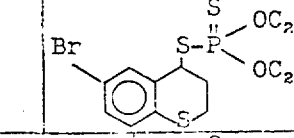 | $n_D^{28}$ 1,633 | 93 | 37.77<br>4.56<br>7.51<br>23.24 | C<br>H<br>P<br>S | 37.6<br>4.2<br>7.0<br>22.9 |
| 26 | 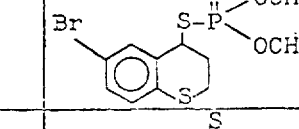 | $n_D^{28}$ 1,637 | 81 | 34.28<br>3.64<br>8.05<br>24.93 | C<br>H<br>P<br>S | 34.8<br>3.7<br>8.2<br>26.0 |
| 27 | 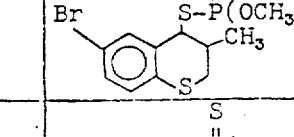 | $n_D^{24}$ 1,6072 | 68 | 36.2<br>4.0<br>7.7 | C<br>H<br>P | 35.8<br>4.3<br>7.6 |
| 28 | 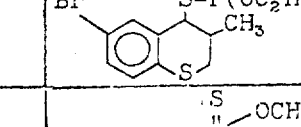 | $n_D^{24}$ 1,615 | 67 | 7.2<br>22.5 | P<br>S | 7.0<br>22.2 |
| 29 | 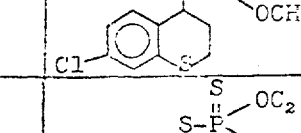 | melting point 65-67 | 91.5 | 38.77<br>4.11<br>9.1<br>28.19 | C<br>H<br>P<br>S | 39.3<br>4.1<br>8.8<br>28.0 |
| 30 | 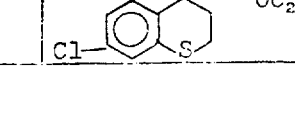 | $n_D^{34}$ 1.6061 | 85 | 42.34<br>4.88<br>8.41<br>26.06 | C<br>H<br>P<br>S | 42.1<br>5.2<br>8.4<br>26.1 |

-Continued

| Example | Formula | $n_D$ or melting point (°C) | Yield % of theoretical yield | Analysis Calc. | | Found |
|---|---|---|---|---|---|---|
| 31 | 6-Cl-thiochroman-4-yl-S-P(O)(OCH$_3$)$_2$ | $n_D^{24}$ 1.5928 | 75 | 9.5<br>19.7 | P<br>S | 9.5<br>19.3 |
| 32 | 6-Cl-thiochroman-4-yl-S-P(O)(OC$_2$H$_5$)$_2$ | $n_D^{24}$ 1.5798 | 87 | 8.8<br>18.2 | P<br>S | 8.6<br>17.9 |
| 33 | 6-CH$_3$-7-Cl-thiochroman-4-yl-S-P(S)(OCH$_3$)$_2$ | $n_D^{22}$ 1.6156 | 97 | 40.7<br>4.5<br>8.7<br>27.0 | C<br>H<br>P<br>S | 40.4<br>4.8<br>8.4<br>26.6 |
| 34 | 6-CH$_3$-7-Cl-thiochroman-4-yl-S-P(S)(OC$_2$H$_5$)$_2$ | $n_D^{22}$ 1.6102 | 91 | 43.9<br>5.2<br>8.1<br>25.0 | C<br>H<br>P<br>S | 44.2<br>5.4<br>7.1<br>24.1 |
| 35 | 7-Br-thiochroman-4-yl-S-P(S)(OC$_2$H$_5$)$_2$ | $n_D^{34}$ 1.6154 | 99 | 37.8<br>4.4<br>7.5<br>23.2 | C<br>H<br>P<br>S | 37.5<br>4.6<br>7.5<br>22.6 |
| 36 | 6,7-Cl$_2$-thiochroman-4-yl-S-P(S)(OCH$_3$)$_2$ | $n_D^{23.2}$ 1,635 | 65 | 8.2<br>25.6 | P<br>S | 7.7<br>25.8 |
| 37 | 6,7-Cl$_2$-thiochroman-4-yl-S-P(S)(OC$_2$H$_5$)$_2$ | $n_D^{23.2}$ 1,6221 | 92 | 38.8<br>4.2<br>7.7<br>23.8 | C<br>H<br>P<br>S | 38.6<br>4.2<br>7.3<br>24.2 |
| 38 | 6-CH$_3$-thiochroman-4-yl-S-P(S)(OCH$_3$)$_2$ | $n_D^{31.5}$ 1,6283 | 97 | 9.7<br>30.0 | P<br>S | 9.0<br>29.0 |
| 39 | 6-CH$_3$-thiochroman-4-yl-S-P(S)(OC$_2$H$_5$)$_2$ | $n_D^{32}$ 1,606 | 98 | 48.3<br>6.04<br>27.6 | C<br>H<br>S | 49.3<br>6.0<br>27.1 |
| 40 | 6-(CH$_3$)$_3$C-thiochroman-4-yl-S-P(S)(OCH$_3$)$_2$ | $n_D^{32}$ 1,5919 | 96 | 8.5<br>26.6 | P<br>S | 8.0<br>26.0 |
| 41 | 6-(CH$_3$)$_3$C-thiochroman-4-yl-S-P(S)(OC$_2$H$_5$)$_2$ | $n_D^{29.5}$ 1,5815 | 99 | 24.6 | S | 24.0 |
| 42 | 2-CH$_3$-thiochroman-4-yl-S-P(S)(OCH$_3$)$_2$ | melting point 67-68 | 82.5 | 45.0<br>5.31<br>9.69<br>30.0 | C<br>H<br>P<br>S | 45.2<br>5.3<br>9.4<br>30.0 |

— Continued

| Example | Formula | $n_D$ or melting point (°C) | Yield % of theoretical yield | Analysis Calc. | | Found |
|---|---|---|---|---|---|---|
| 43 | thiochroman with S-P(=S)(OC$_2$H$_5$)$_2$ and CH$_3$ | melting point 49–50 | 85 | 48.28<br>6.03<br>8.91<br>27.6 | C<br>H<br>P<br>S | 48.2<br>6.2<br>8.9<br>28.2 |
| 44 | thiochroman with S-P(=S)(OCH$_3$)$_2$ and CH$_3$ | $n_D^{29.5}$ 1.6112 | 95 | 9.69<br>30.0 | P<br>S | 9.0<br>29.8 |
| 45 | thiochroman with S-P(=S)(OC$_2$H$_5$)$_2$, CH$_3$ | $n_D^{29.5}$ 1.595 | 91 | 48.28<br>6.03<br>8.91<br>27.6 | C<br>H<br>P<br>S | 49.0<br>6.1<br>8.5<br>27.5 |
| 46 | C$_2$H$_5$-thiochroman with S-P(=S)(OCH$_3$)$_2$ | $n_D^{34}$ 1.6028 | 90 | 28.7 | S | 28.7 |
| 47 | C$_2$H$_5$-thiochroman with S-P(=S)(OC$_2$H$_5$)$_2$ | $n_D^{34}$ 1.6128 | 88 | 26.5 | S | 26.8 |
| 48 | CH$_3$O-thiochroman with S-P(=S)(OCH$_3$)$_2$ | $n_D^{31.5}$ 1.601 | 84 | 28.6 | S | 28.2 |
| 49 | CH$_3$O-thiochroman with S-P(=S)(OC$_2$H$_5$)$_2$ | $n_D^{29.5}$ 1.6262 | 90 | 46.2<br>5.78<br>8.52<br>26.4 | C<br>H<br>P<br>S | 46.5<br>5.8<br>8.0<br>26.4 |

Examples of application:

EXAMPLE 50

Bean plants (*Phaseolus vulgaris*) heavily infested with a phosphoric acid ester resistant spiter mite strain (*Tetranychus urticae*) were sprayed, until drip-off began, with an aqueous dilution of an emulsifiable concentrate containing 0.003 weight % of 4-thiochromanyl-0,0-dimethyl-dithiophosphate as active substance. Subsequently, the sprayed plants were placed in a greenhouse at 20° C. Examination under the microscope after 8 days proved that all mobile and immobile stages of the mites were killed.

The phosphoric acid esters tested comparatively showed none or only insufficient activity despite high concentration of active substances (AS = active substance).

| | |
|---|---|
| diazinone 0.1 weight % of AS | 40% killing rate of mite population |
| azinphos-ethyl 0.1 weight % of AS | 60% killing rate of mite population |
| dimethoate 0.1 weight % of AS | no effect |
| demeton-S-methyl 0.1 weight % of AS | no effect |

EXAMPLE 51

Horse beans (*Vicia faba*) heavily infested with bean aphids (*Doralis fabae*) were sprayed, until beginning drip-off, with the aqueous dilution of an emulsifiable concentrate containing 0.00075 weight % of 4-thiochromanyl-0,0-diethyldithiophosphate as active substance. The sprayed plants were then placed at 20° C in a greenhouse; evaluation was carried out 24 hours after the spraying. All aphids were killed.

EXAMPLE 52

Larvae (4th stage) of the Mexican bean beetle (*Epilachna varivestis*) and leaves of the dwarf-bush bean (*Phaseolus vulgaris*) were sprayed, by means of a spraying apparatus, with a dosed amount (corresponding to an application amount of 600 liters of spray liquor/ha in the open fields) of the aqueous dilution of an emulsifiable concentrate containing 4-thiochromanyl-0,0-dimethyl-dithiophosphate. The leaves and beetle larvae were placed in open vessels at 22° C. A concentration of 0.0012 mg of active substance was sufficient to kill all larvae after 48 hours.

EXAMPLE 53

Young apple trees planted in pots and heavily infested with a phosphoric ester resistant strain of the European red mite (*Metatetranychus ulmi*) were sprayed, until beginning drip-off, with the aqueous dilution of an emulsifiable concentrate containing 0.025 weight % of 2-methyl-4-thiochromanyl-0,0-diethyl-dithiophosphate as active substance and subsequently placed in a greenhouse at 20° C.

A microscopic control after 8 days showed that all mobile and immobile stages were killed.

The following commercial phosphoric acid esters used in comparative tests showed no activity at the same and even at higher concentration:

| phenkapton | 0.025 | weight % | no effect |
|---|---|---|---|
| demeton-S-methyl | 0.05 | do. | do. |
| dimethoate | 0.05 | do. | do. |

EXAMPLE 54

Young cotton plants (Gossypium spec.) in pots, infested with African cotton stainers (*Dysdercus fasciatus*), were sprayed, until drip-off, with the aqueous dilution of a wettable powder concentrate containing 0.006 weight % of 3-methyl-4-thiochromanyl-0,0-dimethyl-dithiophosphate as active substance. Subsequently, the plants containing the bugs were put into cylindrical gauze cages and placed in a greenhouse at 20° C. A control after 48 hours showed that all cotton stainers were killed.

The following phosphoric acid esters tested comparatively showed their activity only at a considerably higher concentration:

| | lethal concentr. | |
|---|---|---|
| diazinone | 0.025 % of AS | |
| dimecron | 0.025 % of AS | |
| dimethoate | 0.025 % of AS | (AS = active substance) |
| | | (% = weight %) |
| azinphos-ethyl | 0.05 % of AS | |

EXAMPLE 55

Caterpillars (3rd stage) of the white cabbage butterfly (*Pieris brassicae*) and leaves of white cabbage (*Brassica oleracea var. capitata*) or Savoy cabbage (*Brassica oleracea var. sabauda*) were sprayed with an aqueous dilution of an emulsifiable concentrate of 3-methyl-4-thiochromanyl-0,0-dimethyldithiophosphate, and subsequently placed in open vessels in the laboratory at about 22° C.

A concentration of active substance of 0.005 weight % or 0.003 mg/cm$^2$ was sufficient to obtain a 100% kill of the caterpillars after 48 hours.

EXAMPLE 56

In the manner described in Example 54, the compound 6 -methyl-4-thiochromanyl-0,0-dimethyl-dithiophosphate was tested on the African cotton stainer (*Dysdercus fasciatus*), in which test all bugs were killed within 48 hours using a concentration of 0.006 weight % of active substance in the spray liquor.

EXAMPLE 57

About 7 weeks old larvae of the mealworm (*Tenebrio molitor*) on a substrate (filter paper) were sprayed with a dosed amount of an aqueous suspension of a wettable powder of 6-methyl-4-thiochromanyl-0,0-dimethyl-dithiophosphate, and subsequently placed in the laboratory on Petri dishes at about 22° C.

A concentration of 0.003 mg/cm$^2$ of active substance was sufficient to kill all larvae within 48 hours.

EXAMAPLE 58

Larvae of the yellow fever mosquito, stage IV (*Aedes aegypti*) and other mosquito larvae, stage IV (*Culex pipiens*) were placed in beakers containing 100 ml of an aqueous dilution of a wettable powder concentrate, the concentration of 6-fluoro-4-thiochromanyl-0,0-dimethyl-dithiophosphate being 0.0006 ppm. This concentration was sufficient to kill all larvae within 24 hours.

This concentration is only 1/2,000 of that killing fish (for example, *Lebistes reticulatus* and *Xiphophorus helleri*), and 1/100,000 of that killing fish nutrition organisms (*Daphnia magna*) within the same period of time.

Phosphoric esters applied also as agents for combating mosquito larvae, for example fenitrothion, dursban, or dichlorvos, showed a higher degree of toxicity in the above fish (1/500 ratio). Thus, 6-fluoro-4-thiochromanyl-0,0-dimethyl-dithiophosphate can be employed with considerably reduced risks for fish in waters infested with fever mosquitoes.

EXAMPLE 59

In the manner described in Example 53, the compound 6-chloro-4-thiochromanyl-0,0-diethyl-dithiophosphate was tested on a phosphoric ester resistant strain of the European red mite (*Metatetranychus ulmi*). At a concentration of 0.006 weight % of active substance, all mobile and immobile stages of the mite population were killed.

Also the phosphoric esters tested again as a comparison has no effect when used in the concentrations indicated in Example 53.

EXAMPLE 60

In the manner described in Example 54, the compoumd 6-chloro-4-thiochromanyl-0,0-dimethyl-dithiophosphate was tested on the African cotton stainer. All bugs were killed at a concentration of 0.003 weight % of active substance in the spray liquor.

EXAMPLE 61

3 to 4 Weeks old grain weevils (*Calandra granaria*) were treated, as described in Example 40, with an aqueous suspension of a wettable powder of 6-fluoro-4-thiochromanyl-0,0-dimethyldithiophosphate. 0.003 mg of active substance per cm$^2$ resulted in a 100% mortaility rate after 48 hours.

EXAMPLE 62

In the manner described in Example 57, the compound 6-fluoro-4-thiochromanyl-0,0-diethyl-dithiophosphate as aqueous dilution of an emulsifiable concentrate was tested on larvae of the mealworm. After 48 hours, all test insects were killed at a concentration of 0.005 weight % or 0.003 mg/cm$^2$ of active substance.

EXAMPLE 63

In the manner described in Example 52, 6-chloro-4-thiochromanyl-0,0-diethyl-dithiophosphate (A) as aqueous suspension of a wettable powder and 6-chloro-4-thiochromanyl-0,0-diethylthiophosphate (B) as emulsion were tested on larvae of the Mexican bean beetle. Both substances gave excellent results in combating beetle larvae. After 48 hours, a 100% mortality rate was obtained using 0.0006 mg of active substance per cm$^2$ in the case of (A) and 0.0012 mg of active substance per cm$^2$ in the case of (B).

EXAMPLE 64

In the manner described in Example 54, 6-methoxy-4-thiochromanyl-0,0-diethyl-dithiophosphate was tested as spray liquor on the American milkweed bug (*Oncopeltus fasciatus*). All bugs were killed at a concentration of 0.006 weight % of active substance.

EXAMPLE 65

1 ml each of a suspension of nematodes comprising all development stages (*Meloidogyne incognita*), which had been dyed in a 0.1% acridine orange solution, was introduced into an aqueous medium containing different concentration amounts of 4-thiochromanyl-0,0-dimethyl-dithiophosphate as active substance.

After 72 hours the percent mortality was determined by means of a fluorescence microscope. The test compound containing 0.3 weight % of active substance had an activity three times that of the known compound carbofuran applied in a comparative test.

EXAMPLE 66

In vitro test on ticks of the Boophilus species
1. Boophilus microplus
   a. strain of normal sensitivity
   b. Biarra strain, resistant
   c. Mackay strain, resistant
2. Boophilus decoloratus, resistant strain For the preparation of a suitable formulation, 10 parts by weight of active substance were dissolved in 100 parts by volume of a mixture of cyclohexanone and nonylphenol (10 EO, 8:1), and the emulsifiable concentrate so obtained was diluted with water to obtain the desired concentration.

10 Adult female ticks of the cited species and different sensitivity to phosphoric esters, which had sucked themselves full of blood, were dipped for 5 minutes into these dilutions. Subsequently, the ticks were sticked with their dorsal side onto an adhesive tape and kept in a warming closet (28° C, about 80% of relative air moisture) for the oviposition.

Two weeks after treatment the activity of the formulations was determined by evaluating the inhibition of oviposition expressed in percent; 100% inhibition meaning that all ticks treated with one active substance concentration did not oviposit, 0% meaning that all ticks did oviposit.

Table I
In vitro test on ticks of different phosphoric ester sensitivity.

| Example | Active substance | Concentration of active substance in % | Inhibition of oviposition in % | | | |
|---|---|---|---|---|---|---|
| | | | Boophilus microplus | | | Boophilus decoloratus (resistant) |
| | | | strain of normal sensitivity | Biarra strain (resistant) | Mackay strain (resistant) | |
| 1 | 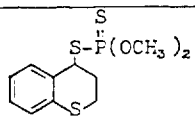 | 0.2<br>0.05<br>0.012<br>0.006 | 70<br>60<br>50<br>30 | 90<br>90<br>90<br>90 | 90<br>90<br>80<br>60 | 20<br>10<br>0<br>0 |
| 2 | 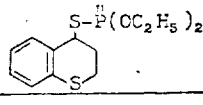 | 0.2<br>0.05<br>0.012<br>0.006 | 90<br>90<br>90<br>30 | 10<br>0<br>0<br>0 | 10<br>0<br>10<br>0 | 80<br>20<br>20<br>0 |
| 5 | 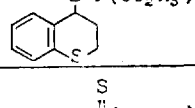 | 0.2<br>0.05<br>0.012<br>0.006 | 100<br>100<br>100<br>100 | 100<br>30<br>10<br>0 | 80<br>20<br>0<br>0 | 100<br>100<br>100<br>0 |
| 7 | 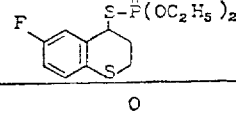 | 0.2<br>0.05<br>0.012<br>0.006 | 100<br>100<br>90<br>70 | 40<br>10<br>0<br>0 | 70<br>20<br>0<br>0 | 90<br>60<br>10<br>0 |
| 9 | 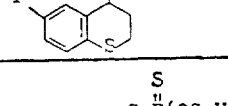 | 0.2<br>0.05<br>0.012<br>0.006 | 90<br>90<br>90<br>90 | 100<br>90<br>90<br>0 | 100<br>90<br>20<br>10 | 100<br>90<br>90<br>30 |
| 11 | 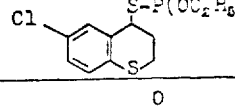 | 0.2<br>0.05<br>0.012<br>0.006 | 100<br>100<br>100<br>40 | 10<br>0<br>0<br>0 | 90<br>10<br>10<br>20 | 100<br>40<br>0<br>0 |
| 12 | 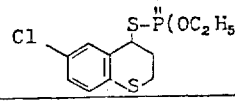 | 0.2<br>0.05<br>0.012<br>0.006 | 100<br>100<br>100<br>70 | 100<br>90<br>70<br>40 | 90<br>90<br>90<br>30 | 100<br>100<br>100<br>100 |
| 23 | 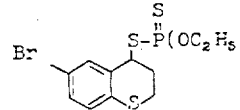 | 0.2<br>0.05<br>0.012<br>0.006 | 100<br>90<br>90<br>50 | 10<br>0<br>0<br>10 | 0<br>10<br>0<br>10 | 100<br>90<br>10<br>10 |
| 24 | 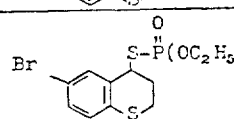 | 0.2<br>0.05<br>0.012<br>0.006 | 100<br>90<br>90<br>90 | 90<br>80<br>70<br>60 | 100<br>90<br>70<br>30 | 100<br>100<br>100<br>60 |

Table I (continued)

In vitro test on ticks of different phosphoric ester sensitivity.

| Example | Active substance | Concentration of active substance in % | Inhibition of oviposition in % ||||
|---|---|---|---|---|---|---|
| | | | Boophilus microplus ||| Boophilus decoloratus (resistant) |
| | | | strain of normal sensitivity | Biarra strain (resistant) | Mackay strain (resistant) | |
| 20 | Cl-[thiochroman]-CH₃, S-P(OC₂H₅)₂ with S | 0.2<br>0.05<br>0.012<br>0.006 | 100<br>100<br>90<br>50 | 80<br>40<br>0<br>0 | 100<br>70<br>0<br>10 | 90<br>40<br>10<br>0 |
| 39 | H₃C-[thiochroman], S-P(OC₂H₅)₂ with S | 0.2<br>0.05<br>0.012<br>0.006 | 100<br>100<br>100<br>0 | | | |
| 43 | [thiochroman]-CH₃, S-P(OC₂H₅)₂ | 0.2<br>0.05<br>0.012<br>0.006 | 100<br>70<br>0<br>0 | | | |
| 47 | C₂H₅-[thiochroman], S-P(OC₂H₅)₂ | 0.2<br>0.05<br>0.012<br>0.006 | 100<br>90<br>80<br>0 | | | |
| | Cl,Cl,Cl-pyridyl-O-P=S(OC₂H₅)₂ known | 0.2<br>0.05<br>0.012<br>0.006 | 100<br>90<br>100<br>90 | 100<br>50<br>40<br>20 | 100<br>0<br>0<br>0 | 90<br>10<br>0<br>0 |
| | CH₃, Cl-coumarin-O-P=S(OC₂H₅)₂ known | 0.2<br>0.05<br>0.012<br>0.006 | 100<br>90<br>60<br>20 | 80<br>60<br>10<br>0 | | |

EXAMPLE 67

Systemic activity in animals; model test on guinea pigs

For the preparation of an administrable formulation, 2 parts by weight of active substance were dissolved in 100 parts by volume of olive oil and administered as oily solution orally in the desired doses to guinea pigs by means of a probang.

Before the treatment as a comparison, as well as in determined time intervals after the treatment, 10 adult unfed bedbugs (*Cimex lectularius*) each were placed for blood-sucking on the shaved abdominal skin of the guinea pigs.

The mortality rate of the test insect groups fed on the treated guinea pigs was evaluated until up to 24 hours after blood intake. The activity was 100% if all test insects had been killed within a certain time after the absorption of blood; it was zero if all test insects of a group were still living.

Table II

Systemic activity in animals/guinea pigs

| Active substance | Dose mg/kg | hrs after treatment put on for blood-sucking | % mortality after hrs. |||||||||
|---|---|---|---|---|---|---|---|---|---|---|---|
| | | | 1 | 2 | 3 | 4 | 5 | 6 | 7 | 8 | 24 |
| Cl-[thiochroman]-S-P(OCH₃)₂ with S | 100 | comparison<br>1<br>3<br>7<br>24<br>48 | 0<br>0<br>0<br>20<br><br>0 | 0<br>0<br>70<br><br><br>0 | 0<br>40<br>100<br><br><br>0 | 0<br>90<br><br><br><br>0 | 0<br>100<br><br><br><br>0 | 0<br><br><br><br>10<br>0 | 0<br><br><br><br>10<br>0 | 0<br><br><br><br>30<br>0 | 0<br><br><br>100<br>100<br>0 |
| | 50 | comparison<br>1<br>3<br>7<br>24<br>48 | 0<br>0<br>0<br>0<br>0<br>0 | 0<br>0<br>0<br><br>0<br>0 | 0<br>40<br>0<br><br>0<br>0 | 0<br>90<br>20<br><br>0<br>0 | 0<br>90<br>40<br><br>0<br>0 | 0<br>100<br><br><br>0<br>0 | 0<br><br><br><br>0<br>0 | 0<br><br><br><br>0<br>0 | 0<br><br>100<br>100<br>0<br>0 |
| | 25 | comparison<br>1<br>3<br>7<br>24<br>48 | 0<br>0<br>0<br>0<br>0<br>0 | 0<br>0<br>90<br>0<br>0<br>0 | 0<br>0<br>100<br>0<br>0<br>0 | 0<br>0<br><br>0<br>0<br>0 | 0<br>0<br><br><br>0<br>0 | 0<br>0<br><br><br>0<br>0 | 0<br>0<br><br><br>0<br>0 | 0<br>0<br><br><br>0<br>0 | 0<br>100<br><br>100<br>0<br>0 |

Table II (continued)
Systemic activity in animals/guinea pigs

| Active substance | Dose mg/kg | hrs after treatment put on for blood-sucking | % mortality after hrs. | | | | | | | | |
|---|---|---|---|---|---|---|---|---|---|---|---|
| | | | 1 | 2 | 3 | 4 | 5 | 6 | 7 | 8 | 24 |
| 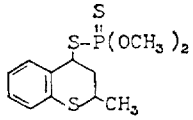 | 100 | comparison 1 3 7 | 0 0 0 0 | 0 100 90 0 | 0 100 100 0 | 0 | 0 | 0 | 0 | 0 | 0 0 |
| 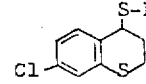 | 100 | comparison 1 3 7 24 | 0 100 100 0 0 | 0 0 | 0 | 0 | 0 | 0 | 0 | 0 | 0 100 0 |
| 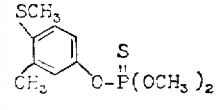 | 50 | comparison 1 3 7 24 | 0 0 100 20 0 | 0 0 0 | 0 0 0 | 0 0 | 0 0 | 0 | 0 | 0 | 0 0 100 0 |
| $CCl_3-CH(OH)-\overset{O}{\underset{\|}{P}}(OCH_3)_2$ known | 50 | comparison 1 3 7 | 0 100 0 0 | 0 0 0 | 0 0 0 | 0 0 | 0 0 | 0 | 0 | 0 | 0 0 0 |
| | 25 | comparison 1 3 7 | 0 90 0 0 | 0 90 0 0 | 0 100 0 0 | 0 0 0 | 0 0 0 | 0 | 0 | 0 | 0 0 0 |
| 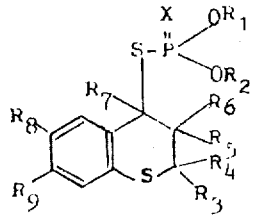 | 50 | comparison 1 3 7 | 0 40 0 0 | 0 100 100 | 0 | 0 | 0 | 0 | 0 | 0 | 0 100 |
| known | 25 | comparison 1 3 7 | 0 0 0 0 | 0 0 0 100 | 0 0 | 0 0 | 0 0 | 0 | 0 0 | 0 0 | 0 30 100 |

Toxicological data
Thiochromanyl-phosphoric acid esters

| 4-thiochromanyl-0,0-dimethyl-dithiophosphate | LD 50 5– 10 mg/kg rat orally |
| 6-chloro-4-thiochromanyl-0,0-diethyl-dithiophosphate | LD 50 63–200 mg/kg rat orally |
| 6-chloro-4-thiochromanyl-0,0-dimethyl-dithiophosphate | LD 50 200–630 mg/kg rat orally |

We claim:
1. A compound of the formula

$$\begin{array}{c} X \\ \| \\ S-P \\ \diagup \diagdown \\ OR_1 \quad OR_2 \end{array}$$

(with ring system bearing $R_3$–$R_9$)

wherein
$R_1$ and $R_2$ are alkyl having from one to six carbon atoms;
$R_3$, $R_4$, $R_5$, $R_6$, $R_7$ are hydrogen or alkyl having from one to four carbon atoms; at least three of the radicals $R_3$ to $R_7$ being hydrogen;
$R_8$, $R_9$ are hydrogen, halogen, alkyl or alkoxy each having from one to four carbon atoms;
X is oxygen or sulfur.

2. A compound as in claim 1 which is S-(6-fluoro-4-thiochromanyl)-0,0-dimethyl-dithiophosphate.
3. A compound as in claim 1 which is S-(6-fluoro-4-thiochromanyl)-0,0-diethyl-dithiophosphate.
4. A compound as in claim 1 which is S-(6-chloro-4-thiochromanyl)-0,0-diethyl-dithiophosphate.
5. A compound as in claim 1 which is S-(6-chloro-4-thiochromanyl)-0,0-diethyl-thiolphosphate.
6. A compound as in claim 1 which is S-(7-bromo-4-thiochromanyl)-0,0-diethyl-dithiophosphate.
7. A compound as in claim 1 is S-(4-thiochromanyl)-0,0-dimethyl-thiolphosphate.
8. A compound as in claim 1 which is S-(6-chloro-4-thiochromanyl)-0,0-dimethyl-thiolphosphate.
9. A compound as in claim 1 which is S-(6-bromo-4-thiochromanyl)-0,0-dimethyl-thiolphosphate.

* * * * *